(12) United States Patent
Kaessberger et al.

(10) Patent No.: US 8,936,771 B2
(45) Date of Patent: *Jan. 20, 2015

(54) PRECIPITATED CALCIUM CARBONATE PIGMENT, ESPECIALLY FOR USE IN INKJET PRINTING PAPER COATINGS

(75) Inventors: Michael Kaessberger, Sempach (CH); Michael Pohl, Villach (AU)

(73) Assignee: Omya International AG, Oftringen (CH)

( * ) Notice: Subject to any disclaimer, the term of this patent is extended or adjusted under 35 U.S.C. 154(b) by 1092 days.

This patent is subject to a terminal disclaimer.

(21) Appl. No.: 11/887,749

(22) PCT Filed: Mar. 29, 2006

(86) PCT No.: PCT/IB2006/000932
§ 371 (c)(1), (2), (4) Date: Oct. 3, 2007

(87) PCT Pub. No.: WO2006/109168
PCT Pub. Date: Oct. 19, 2006

(65) Prior Publication Data
US 2009/0022912 A1 Jan. 22, 2009

(30) Foreign Application Priority Data
Apr. 11, 2005 (EP) .................................... 05075840

(51) Int. Cl.
*C01F 1/00* (2006.01)
*C01F 5/24* (2006.01)
(Continued)

(52) U.S. Cl.
CPC ............ *C01F 11/181* (2013.01); *B41M 5/5218* (2013.01); *C01F 11/182* (2013.01);
(Continued)

(58) Field of Classification Search
USPC .................................. 423/165, 432; 106/464
See application file for complete search history.

(56) References Cited

U.S. PATENT DOCUMENTS 3,003,010 A * 10/1961 Meuret et al. .................. 524/426
3,853,488 A * 12/1974 Taylor .......................... 23/293 A
(Continued)

FOREIGN PATENT DOCUMENTS

EP 0761782 A1 3/1997
EP 0768344 A2 4/1997
(Continued)

OTHER PUBLICATIONS

The International Search Report for PCT Application No. PCT/IB2006/000932, mailed Dec. 19, 2007.
(Continued)

*Primary Examiner* — Shuangyi Abu Ali
(74) *Attorney, Agent, or Firm* — Amster, Rothstein & Ebenstein LLP

(57) ABSTRACT

The invention relates to novel and innovative PCC pigments, able to be used in a paper coating formulations to manufacture coated "multipurpose" papers, in particular for inkjet applications, whose print qualities would be identical or quite similar to high resolution commercial papers, while maintaining a reduced paper manufacturing and production cost. Said pigments are obtained by a carbonation process using a reduced flow rate of $CO_2$/air, which leads to porous agglomerates of PCC of a very specific structure and unique properties, followed by an upconcentration step leading to substantially the same agglomerates but with a higher, appropriate, solids content.

49 Claims, 5 Drawing Sheets

Steps A

I: Water
II: Quicklime
III: Stirred Reactor
IV: 100 µm Screen
V: Non-reactive Unburnt Lime
VI: Calcium Hydroxide Slurry
VII: Baffled Cylindrical Stainless Steel Reactor Equipped with a Gasing Agitator
VIII: Mg Sulphate Solution
IX: Group II and/or Group III Metal Sulphate
X: Sulphuric Acid
XI: Carbon Dioxide Gas/Gas Mixture
XII: 45 µm Screen
XIII: Non-reactive Unburnt Lime
XIV: Invention PCC Slurry

(51) Int. Cl.
*C01F 11/18* (2006.01)
*C22B 26/20* (2006.01)
*B41M 5/52* (2006.01)
*C09C 1/02* (2006.01)
*D21H 19/38* (2006.01)

(52) U.S. Cl.
CPC .............. *C01F11/185* (2013.01); *C09C 1/022* (2013.01); *B41M 2205/12* (2013.01); *C01P 2004/54* (2013.01); *C01P 2004/61* (2013.01); *C01P 2006/12* (2013.01); *D21H 19/385* (2013.01); *C01P 2006/22* (2013.01); *C01P 2006/60* (2013.01)
USPC ......................................... 423/165; 423/432

(56) References Cited

U.S. PATENT DOCUMENTS

| | | | | |
|---|---|---|---|---|
| 4,714,603 | A | | 12/1987 | Vanderheiden |
| 5,007,964 | A | * | 4/1991 | Tsukisaka et al. ............ 106/464 |
| 5,342,600 | A | * | 8/1994 | Bleakley et al. ............. 423/432 |
| 5,695,733 | A | | 12/1997 | Kroc et al. |
| 5,750,086 | A | * | 5/1998 | You ............................... 423/432 |
| 5,759,258 | A | * | 6/1998 | Sohara et al. ................. 106/464 |
| 6,071,336 | A | | 6/2000 | Fairchild et al. |
| 6,143,065 | A | * | 11/2000 | Freeman et al. .............. 106/464 |
| 6,156,286 | A | * | 12/2000 | Fortier et al. ................. 423/432 |
| 2002/0009410 | A1 | * | 1/2002 | Mathur ......................... 423/430 |
| 2003/0227531 | A1 | | 12/2003 | Hosoi et al. |
| 2004/0247513 | A1 | | 12/2004 | Huhn, III |

FOREIGN PATENT DOCUMENTS

| | | | | |
|---|---|---|---|---|
| JP | 01 018911 A | | 1/1989 | |
| JP | 03 228819 A | | 9/1991 | |
| JP | 10265725 A | | 10/1998 | |
| JP | 2000-086237 | * | 3/2000 | .............. C01F 11/18 |
| JP | 2001 270713 A | | 3/2000 | |
| JP | 2000086237 | | 3/2000 | |
| JP | 2001-072413 | * | 3/2001 | .............. C01F 11/18 |
| JP | 2001-270713 | * | 10/2001 | .............. C01F 11/18 |
| JP | 2004197055 A | | 7/2004 | |
| JP | 2004299302 A | | 10/2004 | |
| WO | WO 96/29369 | | 9/1996 | |
| WO | 9852870 A1 | | 11/1998 | |
| WO | 9951691 A1 | | 10/1999 | |
| WO | 0145956 A1 | | 6/2001 | |
| WO | WO 2006/109171 | | 10/2006 | |

OTHER PUBLICATIONS

The Written Opinion of the International Searching Authority for PCT Application No. PCT/IB2006/000932, mailed Dec. 19, 2007.

* cited by examiner

Figure 1: Steps A

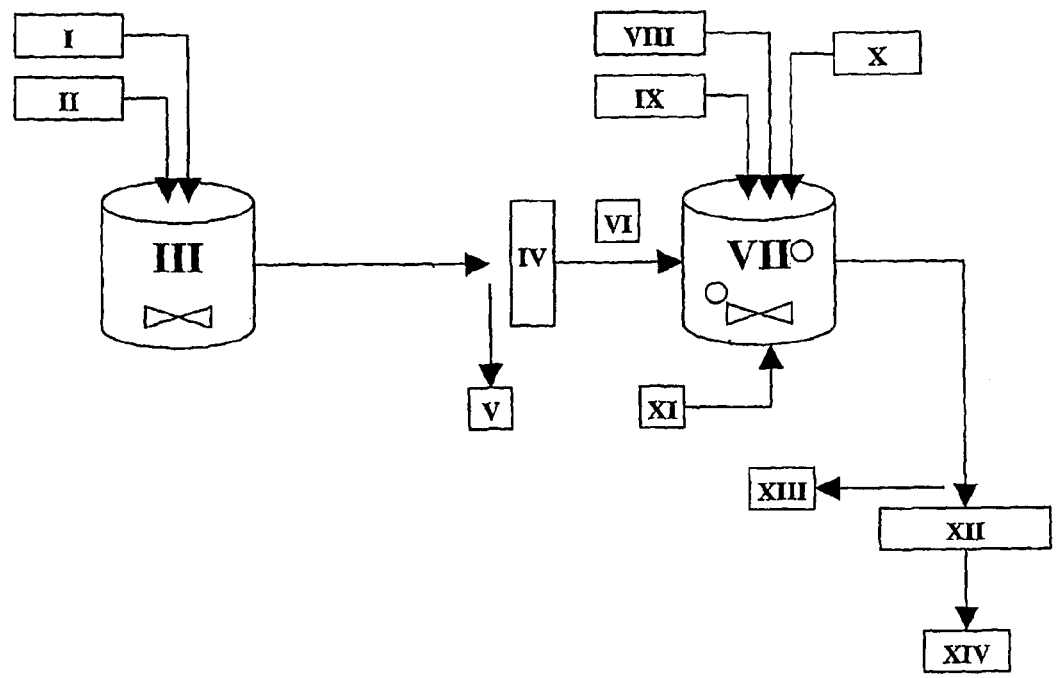

I: Water
II: Quicklime
III: Stirred Reactor
IV: 100 μm Screen
V: Non-reactive Unburnt Lime
VI: Calcium Hydroxide Slurry
VII: Baffled Cylindrical Stainless Steel Reactor Equipped with a Gasing Agitator
VIII: Mg Sulphate Solution
IX: Group II and/or Group III Metal Sulphate
X: Sulphuric Acid
XI: Carbon Dioxide Gas/Gas Mixture
XII: 45 μm Screen
XIII: Non-reactive Unburnt Lime
XIV: Invention PCC Slurry

Figure 2: Steps B, Dewatering Centrifuge
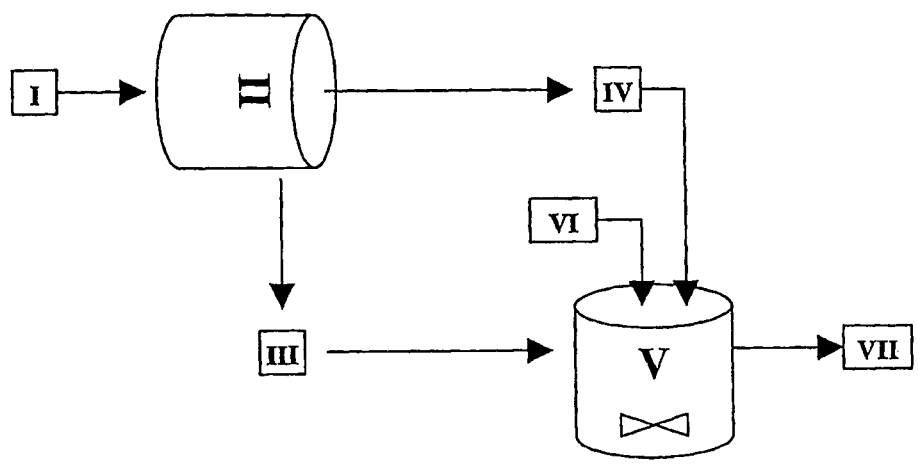
I: PCC slurry from Steps A
II: Dewatering centrifuge
III: Filtrate
IV: Filter Cake
V: Dispersing Unit
VI: Solution of a Dispersing Aid (such as a Sodium Salt of Polyacrylic Acid or a Sodium Citrate/Carboxy Methyl Cellulose mixture)
VII: Upconcentrated PCC Slurry

Figure 3: Steps B, Dewatering Centrifuge
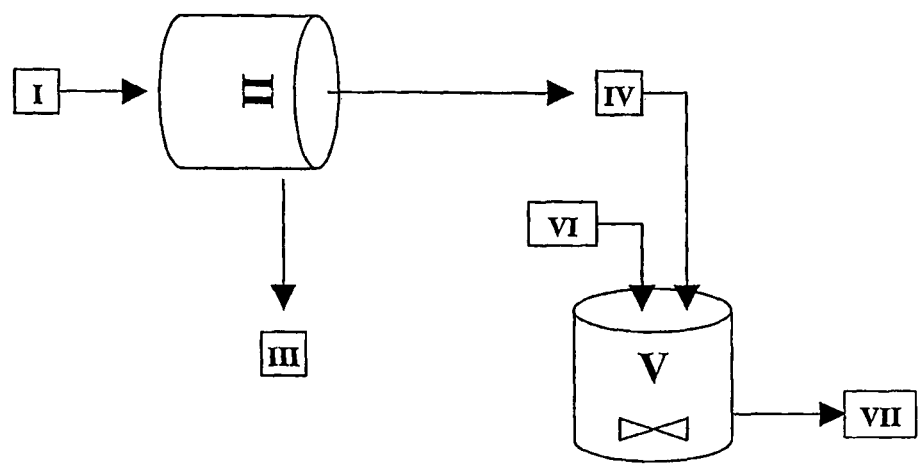
I:   PCC slurry from Steps A
II:  Dewatering centrifuge
III: Filtrate
IV:  Filter Cake
V:   Dispersing Unit
VI:  Solution of a Dispersing Aid (such as a Sodium Salt of Polyacrylic Acid)
VII: Upconcentrated PCC Slurry

Figure 4: Steps B, Thermal Upconcentration Under Vacuum
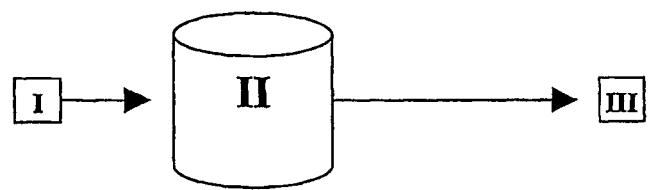
I: PCC slurry from Steps A
II: Thermal Evaporator
III: Upconcentrated PCC Slurry

Figure 5: Steps B, Thermal Upconcentration On A Heating Plate
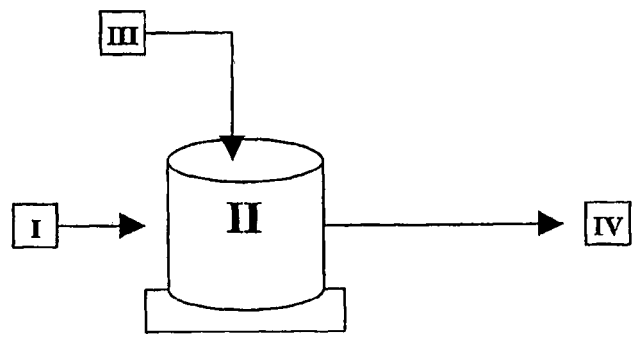
I:   PCC slurry from Steps A
II:  Heating Plate
III: Cationic Copolymer/Hydroxy Ethyl Cellulose
IV:  Upconcentrated PCC Slurry

PRECIPITATED CALCIUM CARBONATE PIGMENT, ESPECIALLY FOR USE IN INKJET PRINTING PAPER COATINGS

This is a U.S. national phase of PCT Application No. PCT/IB2006/000932, filed Mar. 29, 2006 and claims priority to European Application No. 05075840.8, filed Apr. 11, 2005.

TECHNICAL FIELD OF THE INVENTION

The present invention relates to novel mineral pigments of the precipitated calcium carbonate species (PCC).

More specifically, the invention relates to novel and innovative PCC pigments, able to be used in a paper coating formulations to manufacture coated "multipurpose" papers, in particular for inkjet applications, whose print qualities would be identical or quite similar to high resolution commercial papers, while maintaining a reduced production cost. Multipurpose papers are typical used as paper for a variety of printing types, and include uses as black and white copy, laser printing and fax paper.

The invention additionally relates to the production of said novel mineral pigments of the PCC species in slurry form, present in a solids content appropriate for inkjet paper coating on a low cost paper coater, such as the Metered Size Press (MSP).

TECHNICAL PROBLEMS

There exists a demand for coated multipurpose papers, and in particular for papers suitable for inkjet applications, which give an improved print quality without a corresponding increase in production cost.

Currently available multipurpose office papers are often associated with an unsatisfactory inkjet print quality.

One of the main hurdles to achieve an increase in print quality is to increase the optical density of the ink applied to the paper surface, in particular following full colour spectrum dye ink application.

Inkjet printers form images by applying a series of ink dots on the paper surface. The dye inks used in inkjet printing are generally anionic and in a low solids formulation that is naturally very mobile. Good print quality is only obtained if the ink dye remains on the paper surface as the ink solvent penetrates into the paper, leaving a uniform circular dot at the point of application.

It is known that a charge difference between adsorbent and adsorbate, respectively the paper surface and the dye molecules, is generally used to promote dye adsorption.

Hence, one solution to increase optical density lies in increasing the number of cationic sites near the paper surface. If the paper surface is coated, the number of cations present near the surface can be increased by adding cationic additives to the coating formulation. However, adding cationic additives in order to obtain a given optical density adds significantly to the final paper cost.

Increasing the fraction of cationic additive retained in a thin layer near the paper surface, characterised by the coating holdout, is a second solution to increase optical density. Higher coating holdout can be achieved through the use of a narrower coating particle size distribution, which is a technically difficult and expensive solution.

If PCC is present in the coating formulation, the inherent adsorptive properties of PCC particles towards ink dyes can offer another alternative to reduce the quantity of cationic additives necessary to ensure a given optical density. For an equal quantity of this pigment, decreasing the primary PCC particle size increases the positively-charged pigment surface area available to interact with and bind ink dye. This promotes ink dye adsorption on the PCC particles near the site of ink application, which leads to an increase in optical density.

Segregation of large dye molecules on the paper surface is also aided by surface size exclusion and a high pore volume coating, allowing the passage of solvent into the base paper while retaining the dye molecules on the surface. This suggests the need for a porous coating formulation; one theoretical solution is therefore to introduce aggregates/agglomerates, such as possibly aggregated pigments, in the coating formulation, with a carefully controlled pore size distribution and capillarity. However, as the skilled man knows, such a theoretical solution is quite difficult to specifically engineer; in the specifically related domain, U.S. Pat. No. 5,750,086 (discussed herebelow) produces finely divided PCC, along with numerous other patents, but not porous products or aggregates/agglomerates.

A second challenge in increasing print quality is to reduce the bleeding phenomenon observed following ink application to the paper surface. Ink dye bleeding of one colour into another adjacent colour occurs as a result of latent ink dye binding to and drying on the paper surface, and is partly due to delayed ink solvent absorption into the base paper, which serves to bring the ink dye in contact with the surface for rapid binding. Bleeding has as a consequence that printed images are distorted and appear less sharp.

Similarly, feathering also results in blurred images and occurs when deposited ink follows the contours of the paper. As with ink bleeding, it is rectified by rapid ink drying, preferring dye absorption to adsorption when using porous media.

As the above implies, there is a need to balance and control ink adsorption onto the pigment surface as opposed to absorption into the void volume of pigment pores, since high absorption leads to decreased bleeding and feathering, but with an accompanying decrease in optical density, whereas high adsorption leads to improved optical density, while increasing bleeding and feathering.

A third challenge in obtaining a high print quality is to decrease the print unevenness in the final paper product. Print unevenness is the result of the inhomogeneous penetration of the ink-binding elements (cationic additive or coating pigment) of the coating formulation into the base paper. Coating formulations having a low solids content present an increased risk of solvent entraining the ink-binding elements away from the paper surface during two phenomena: as the formulation solvent passes into the base paper following paper coating and during the later movement of the solvent to the paper surface during drying. Such surface unevenness can be limited by using a slurry presenting a high solids content, which limits the quantity of solvent passing into and out of the base paper. However, such a high solids content is incompatible with some of the above objectives or theoretical solutions.

When the coating formulation includes a pigment, use of a high solids pigment slurry is desirable, since it is known that the starch binder and other additives generally added to multipurpose paper coating formulations are in the form of a low solids solution. If the solids content of the coating slurry is not maximised, the dilution upon addition of the binder and other additives will be too significant.

The above-listed constraints suggest the need for fixation of dyes on sites distributed homogeneously over the paper surface. It is clearly important that the coating formulation be high in solids, however as is known in the art, upconcentration of aggregate-containing slurries often lead to a loss of important pore volume.

As such, the theoretical solutions to the above-listed problems were not recognized as able to solve the defined problems, and said list to the contrary suggests that they must be delicately weighted and that extremely difficult compromises, if not impossible ones, would have to be found; this was nevertheless one of the objectives of this invention, and it is the merit of the invention to have ultimately reached a global solution.

A second concern of the man skilled in the art is to achieve this balance employing a cost-efficient solution. Any skilled man will appreciate that such a requisite is always a factor highly complicating the definition of a technical solution, especially in the considered domain.

Known multipurpose inkjet papers are characterized by surface sized or slightly pigmented qualities, and generally surface sized or coated on a cost-efficient on-line coater, such as the MSP or Film Press, allowing a high coating application speed and coating a lower coat weight than their off-line-counterparts.

Speciality grade inkjet papers are characterized by a superior high-resolution print quality relative to multipurpose papers. Such papers are generally coated at a high coat weight with formulations including special high quality binders and additives via more costly coating techniques, employing for example Varibar™, airknife, curtain or blade off-line coaters.

Due to raw material cost, production rate, coating weight and composition, and coater type, the cost of known multipurpose inkjet papers is inferior to the cost of high resolution matt inkjet papers by an order of magnitude which is roughly 6 to 20 times. Hence, the man skilled in the art recognises the benefits of being able to obtain a high quality paper coating using a low cost coating solution.

As mentioned above, lowering the cationic additive demand of the coating formulation, relative to current specialty pigments for inkjet, is also desirable for cost savings.

Further, it is of interest to reduce the quantity of binder needed, since this component represents an expensive part of the coating composition and its presence on the paper surface decreases the active area available to interact with ink. One option is to use aggregates/agglomerates presenting appropriately small pores, in which case only sufficient binder to adsorb onto the surface of the aggregates/agglomerates need be added, since the binder cannot attain the surface of the primary particles exposed within the pores. However, as indicated above, this proposal is uniquely theoretical.

As regards the paper coating process, cost reduction can be attained by promoting a more rapid paper drying step following coating. More rapid drying translates to a higher paper machine speed and increased productivity since the risk of wet coating material deposits on the paper-making machine is reduce. More rapid drying is possible through the use of a maximum solids content coating formulation.

A high solids coating formulation also reduces the cost associated with transporting said coating formulation from the pigment manufacturer to the paper mill, respectively coating plant.

A final concern of the man skilled in the art is to ensure an equal or improved runnability (number of sheets produced without failure) on coating machines. It is known that coaters such as the MSP or the Film Press demonstrate an improved runnability when using an increased coating slurry solids content, while maintaining a low (500 to 1500 mPaS) slurry viscosity.

As the skilled man will appreciate, these are additional technical problems to be solved. The skilled man will also recognise that many of said problems call for conflicting or antagonist solutions, which lead to severe problems if not properly balanced; this was the difficult problem solved by this invention.

As mentioned above, the overall technical problem, and technical challenge, is to develop a novel class of PCC pigments structured to be used in a paper coating process to manufacture a paper which is "technically speaking" a coated multipurpose paper, in particular for inkjet applications, but whose print properties would be improved relative to other coated papers of the same grade, while maintaining a low production cost.

Last but not least, the solution must of course fit to as many types of printers as possible, if not all, adding another complexity to resolve.

Any skilled person will recognize both the commercial need for such an innovative technology, the paramount technical challenge it represents, and the considerable technical, commercial and financial advance it would bring.

PRIOR ART

Pigment options for use in multipurpose inkjet paper coatings currently on the market include specialty PCC inkjet pigments, such as those of EP 0 815 174, or expensive fumed or precipitated silica.

Besides its considerable cost as a coating material, it is know that silica is generally limited to low solids formulations, whose use considerably reduces the coating line speed, further increasing to overall coating cost. The man skilled in the art is therefore motivated to seek lower cost coating alternatives available in higher solids formulations.

According to EP 0 815 174, which relates to coating a PCC, an organophosphonate compound, such as an amine-containing phosphoric acid or ethanol amine bis-(methylenephosphonic acid), is added to a PCC slurry in a quantity corresponding to 0.4 to 0.85% by weight relative to the weight of PCC. Said slurry is then heat aged over a sufficient time period (1 to 10 hours at a temperature exceeding 75° C., or 2 to 5 hours at 80 to 85° C.) to impart a specific surface area exceeding 60 $m^2/g$.

Alum or other inorganic, aluminium-containing compounds can be co-precipitated during the synthesis of PCC. In Example 1 of this patent, addition of aluminium sulphate octadecahydrate is performed just prior to the carbon dioxide introduction. Optionally, up to 10% by weight of hydrated aluminium sulphate can also be introduced.

The heat ageing and/or milling of the PCC are regarded as critical in order to reach an appropriate level of ink binding to the PCC.

To the contrary, as will be seen below, neither expensive, time-consuming heat ageing nor milling are required in the present invention; indeed, in the present invention, heat ageing even results in an inadmissible loss of PCC surface area. Furthermore, the solids content of the slurry disclosed in the examples was low, near to 20%.

EP 1 246 729 is presented as an improvement over the above mentioned patent, and the product of this patent is said to feature a surface area of 60 to 65 $m^2/g$, preferably 80 to 90 $m^2/g$, and generally no more than 95 to 100 $m^2/g$. That surface area is said to be obtained by heat ageing in the presence of an organophosphonate compound, as indicated above. The PCC particles are said to be individually spherical in shape, with a diameter of the order of 0.02 to 0.03 μm. This high specific surface area PCC presenting a narrow particle size is obtained in a low solids (25%) slurry.

The alleged innovation in EP 1 246 729 comes from the combination of a finely divided PCC, presenting a surface area exceeding 60 m²/g, in a major proportion, and a minor proportion of a gel-type silica, along with a binder.

The resulting composition can be blade coated, or less preferably coated using an air knife and Meyer bar.

The required presence of expensive silica and the low solids content of the slurry represent major drawbacks.

U.S. Pat. No. 5,750,086 describes a process for manufacturing ultrafine particles of colloidal calcium carbonate (PCC), in which magnesium sulphate is added to a 3 to 14% by weight aqueous suspension of calcium hydroxide, followed by carbonation with the introduction of zinc sulphate alone or together with sulphuric acid.

In the examples, the introduced metal salts solutions or sulphuric acid have a concentration of 10% by weight.

The process is said to lead to chain-structured ultrafine particles of colloidal calcium carbonate having an average diameter of 0.01 µm of smaller, an average length of 0.05 µm or smaller, and a BET specific surface area of 70 m²/g or greater.

The obtained ultrafine particles are said to "show lower affinity of aggregation". Indeed, the applicant primarily targets applications requiring non-aggregated fillers, such as plastic applications wherein the dispersibility of the end product is important. The present invention, by contrast, targets an aggregated product for inkjet paper applications.

The specific gas flow rate of 120 liters per minute per kilogram calcium hydroxide as indicated in the U.S. Pat. No. 5,750,086 examples, however, is quite significantly higher compared to the process conditions of the present invention, as will be seen herebelow.

Indeed, it was found according to the present invention and contrary to the teaching of the prior art and common knowledge, that by reducing the specific gas flow rate to below about 30 or below about 20 liters per minute per kilogram calcium hydroxide during precipitation, one obtains not the discrete pigment described in U.S. Pat. No. 5,750,086, but rather coarse mechanically stable porous spherical agglomerates/aggregates consisting of said colloidal calcium carbonate.

As mentioned above, while it was possible to theorize regarding the potential interest of porous PCC with an appropriate pore size distribution, possibly obtained via an agglomeration process, this remained theoretical until the above surprising innovation. It has also to be noted that there is no indication whatsoever in the prior art or in the common knowledge that altering one parameter among dozens in the PCC preparation process, would lead to porous agglomerates. There is even less indication that those agglomerates would be stable. There is still less indication that the parameter to be modified was precisely said flow rate.

The process of U.S. Pat. No. 5,750,086 was reproduced with the above mentioned, decisive, modification to the gas flow rate and the obtained product properties are shown in Table 2, Example 1.

As can be seen in Table 2, the product obtained by altering the teaching of U.S. Pat. No. 5,750,086 according to the invention is, quite surprisingly, not the discrete pigment described in U.S. Pat. No. 5,750,086, but rather coarse agglomerates.

However, a problem with the slurry produced in Example 1 is the low solids content which is useful in some applications in the considered industries, but is not suitable for multipurpose paper coating on coaters such as the MSP. This represented an additional problem to be solved, as will be seen herebelow.

This surprising result is one of the key starting points of the present invention.

ADDITIONAL PRIOR ART

Japanese patent 2004-299302 teaches an inkjet record form featuring an "ink acceptance layer", said layer comprising calcium carbonate as a principal pigment, which leads to improved feathering and bleeding. There is no specific indication as to the properties or structure of said calcium carbonate to be used. This document instead focuses on the use of a dispersant and the cationic charge density of said dispersant.

EP 0 761 782, Japanese patent 10-265 725 and Japanese patent 2004-197 055 each describe improved inks for inkjet printing, namely used to improve optical density, bleeding and/or feathering upon printing. None of these patents give a specific indication as to the coating pigment to be used when preparing the paper sheet.

US 2003/0227 531 A1 discloses a paper coating of a polyvalent metal salt, such as calcium, magnesium or aluminium onto one surface of the base paper, in order to improve feathering and bleeding.

SUMMARY OF THE INVENTION

The objectives of the invention can only be fully reached by the combination of the specific process for preparing porous, stable, agglomerates of PCC, using a decisively reduced gas flow rate for the carbonation step, and of the selected upconcentration steps to produce a high solids PCC slurry suitable for inkjet paper coating applications.

It is briefly reminded here that PCC is generally obtained in the prior art via the following steps: a calcium hydroxide slurry at about 13% solids is first prepared by slaking; calcium oxide (also referred to as burnt lime or quicklime) is mixed with water in a stirring reactor or tank. Said calcium hydroxide slurry is then screened, such as on a 100 µm screen, to remove any residual impurities and/or non-reactive unburnt lime, and then directed towards a stainless steel reactor equipped with an agitator. The temperature is adjusted, generally to around 20° C., and subsequently the slurry is directed towards the carbonation reactor or tank where carbon dioxide is bubbled through, optionally with air, precipitating PCC. The PCC slurry leaves the carbonation tank when appropriate in view of an appropriate drop in pH and/or conductivity.

The above is known to the skilled man, and the following patents are incorporated herein by reference: EP 0 768 344, WO 98/52870 (PCT/US98/09019) and WO 99/51691 (PCT/US99/07233).

Generally speaking, the present invention resides in a series of first steps (Steps A) leading to the production of a low solids PCC slurry, comprising essentially porous, stable, agglomerates/aggregates of PCC particles, possibly followed by the upconcentration of said slurry (Steps B) without loss of said agglomerates/aggregates.

Steps A of the invention relate to a process for the preparation of porous, stable agglomerates/aggregates of PCC as a low solids slurry, and the so-obtained PCC product, which is a new industrial product.

The invention therefore covers a new process for producing a PCC slurry via the carbonation route, characterized in that the carbonation step is conducted with a carbonation gas flow rate reduced to below 30 liters per minute per kilogram calcium hydroxide during precipitation (Steps A).

The present invention also covers a new process for producing a PCC slurry via the carbonation route, additionally characterized in that the production of PCC as described in the above paragraph is conducted in the presence of magnesium sulphate, in combination with one or more group II or III metal sulphates, said metal sulphate(s) being in particular aluminium based and/or zinc based, preferably aluminium based or zinc based. These steps are based on those described in U.S. Pat. No. 5,750,086, however with the much lower carbonation gas flow rate as mentioned above.

The surprising result is that the pigment obtained is not a non-agglomerating, ultrafine particular, discrete product, but rather coarse (1 to 5 µm range) porous and stable agglomerates/aggregates.

The produced agglomerates/aggregates are surprisingly so stable that they are substantially maintained in agglomerated/aggregated form during a subsequent "upconcentration" step, and astonishingly the finally produced PCC agglomerates/aggregates impart improved print properties when incorporated in inkjet paper coatings, as compared to the print quality of other market papers of the same grade.

In most preferred embodiments, Steps A of the present invention are additionally characterized by the use of the inventive combination of magnesium sulphate and aluminium sulphate, or magnesium sulphate and zinc sulphate.

In less preferred embodiments, the process of the invention uses the combination of magnesium sulphate and zinc sulphate, to which is added aluminium sulphate, or the combination of magnesium sulphate and aluminium sulphate, to which is added zinc sulphate. Further, a less preferred embodiment includes the use of magnesium sulphate and one or more sulphates of group II and/or III metals.

The invention additionally lies in the combination of the PCC production process (Steps A), with subsequent particular upconcentration (dewatering/redispersion) steps in the presence of a dispersant (Steps B).

It is entirely innovative to use the combination: PCC production (Steps A) with the upconcentration process (Steps B) for this type of inkjet application.

The final product is, quite surprisingly, a PCC in the form of stable agglomerates/aggregates having an average diameter in the µm range, namely between 1 and 5 µm, forming a PCC pigment which, when used in a standard coating formulation, leads to a superior print qualities at reduced cost.

The invention also covers novel PCC pigments per se, as new industrial products, in the form of stable agglomerates/aggregates in the µm range, namely between 1 and 5 µm, as obtained at the end of Steps A or at the end of Steps A and B. This is entirely different from the commercial technologies and prior patents.

The invention also covers the novel pigment slurries containing said pigments as new industrial products, namely the low solids slurry obtained at the end of Steps A and the high solids slurry obtained at the end of Steps A and B.

The invention additionally covers novel coating formulations for coating ink jet paper containing said pigments or pigment slurries The invention also covers coated inkjet papers, coated with such novel coating formulations.

BRIEF DESCRIPTION OF THE DRAWINGS

FIG. 1: Schematic of process.
FIG. 2: Representation of a dewatering process in a centrifuge.
FIG. 3: Representation of an alternate dewatering process in a centrifuge.
FIG. 4: Representation of a thermal upconcentration step under vacuum.
FIG. 5: Representation of a thermal upconcentration on a heating plate.

DETAILED DESCRIPTION OF THE INVENTION

The invention relates to:
a process for providing PCC useful for inkjet printing applications,
of the type according to which a calcium hydroxide slurry is first prepared by mixing quicklime (CaO) with water in a stirring reactor or tank ("slake"). The calcium hydroxide slurry is then screened, such as on a 100 µm screen, to remove any residual impurities and/or non-reactive unburnt lime. The screened slurry is then directed towards a stainless steel reactor equipped with an agitator; the temperature is adjusted, generally to between 10 and 70° C., and subsequently the slurry is directed towards a carbonation reactor or tank, wherein carbon dioxide-containing gas is bubbled through the slurry. The slurry exits the carbonation tank when appropriate in view of conductivity and pH, generally when the conductivity reaches a minimum and the pH drops below 8. Coarse particles are removed on a screen, such as a 45 µm screen, such that the slurry contains only the ultrafine PCC agglomerates of the invention,
characterized by the implementation of process steps comprising a series of first steps, relating to the production of the PCC in which:
A1 In a PCC production process as described above, the carbonation step is performed at a carbonation gas flow rate of below about 30 µliters per minute at standard temperature and pressure per kilogram calcium hydroxide during precipitation.

The invention also relates to a process as defined above characterized in that:
A2 In a PCC production process as described above under A1, the slurry of calcium hydroxide leaving said stainless steel reactor after said separation of said residual impurities and/or non-reactive unburnt lime is treated by a combination of magnesium sulphate and Group II and/or Group III metal sulphates, most preferably in the presence of an acid, said acid being most preferably sulphuric acid, until stable, porous agglomerates/aggregates are obtained at a concentration of 5 to 25% solids, preferably 15 to 20% solids ("precursor").

The invention also relates to a process as defined above characterized in that:
A3 In a PCC production process as described above under A1 or A2, the slurry of calcium hydroxide is first prepared by mixing quicklime with water in a stirring reactor or tank ("slake") in a weight ratio of CaO:water between 1:3 and 1:20, preferably between 1:5 and 1:12, most preferably between 1:7 and 1:10.

The invention also relates to a process as defined above characterized in that:
A4 In a PCC production process as described above under A1, A2 or A3, the temperature is preferably adjusted to between 15 and 50° C., most preferably to between 15 and 30° C., before the slurry is directed towards the carbonation reactor or tank.

These steps are schematically shown on attached FIG. 1. On said figure, the references have the following meanings:
I: Water
II: Quicklime
III: Reactor, such as a stirred reactor or tank
IV: Screen, such as a 100 µm screen
V: Residual Impurities and/or Non-reactive Unburnt Lime VI: Calcium Hydroxide Slurry
VII: Reactor, such as a carbonation reactor or tank
VIII: Magnesium Sulphate Solution
IX: Group II and/or Group III Metal Sulphate(s)
X: Optionally acid, such as sulphuric acid
XI: Carbon Dioxide-Containing Gas
XII: Screen, such as a 45 μm screen
XIII: Coarse Particles
XIV: Invention PCC (in a porous, agglomerated form) Slurry Steps A are followed by the upconcentration of the PCC produced during Steps A, in the presence of a cationic, anionic or combination dispersant, under sufficiently gentle or mild conditions for the aggregates/agglomerates not to be substantially destroyed, until a concentration of 25 to 60%, preferably in the range 35 to 50%, most preferably 39 to 40% solids by weight is reached. The amount of dispersant added is controlled so that the PCC agglomerates/aggregates of the precursor are just coated, this quantity corresponding that added prior to a slurry viscosity increase.

If the upconcentration leads to a filter cake, such as following upconcentration performed using a pressurized filter, or a centrifuge, or by vacuum filtration, the concentrated material is optionally washed with water and a redispersion is performed until the final material substantially consists of stable, porous agglomerates/aggregates identical with or very similar to those obtained in Steps A.

The upconcentration can be performed in a thermal evaporation step with the final material substantially remaining in the form of the stable, porous agglomerates/aggregates obtained in Steps A.

The upconcentration of part or all of the precursor may lead to a dry product, and in such a case, the dry product is redispersed until the final material substantially consists of stable, porous agglomerates/aggregates identical with or very similar to those obtained in Steps A.

FIG. 2 represents a dewatering process in a centrifuge, with:
I: PCC slurry from Steps A
I: Dewatering centrifuge
III: Filtrate
IV: Filter Cake
V: Dispersing Unit
VI: Solution of a Dispersing Aid (such as a Sodium Salt of Polyacrylic Acid or a Sodium Citrate/Carboxy Methyl Cellulose mixture)
VII: Upconcentrated PCC Slurry FIG. 3 represents an alternate dewatering process's in a centrifuge, with:
I: PCC slurry from Steps A
II: Dewatering centrifuge
III: Filtrate
IV: Filter Cake
V: Dispersing Unit
VI: Solution of a Dispersing Aid (such as a Sodium Salt of Polyacrylic Acid or a Sodium Citrate/Carboxy Methyl Cellulose mixture)
VII: Upconcentrated PCC Slurry FIG. 4 represents a thermal upconcentration step under vacuum, with:
I: PCC slurry from Steps A
II: Thermal Evaporator
III: Upconcentrated PCC Slurry FIG. 5 represents a thermal upconcentration on a heating plate, with:
I: PCC slurry from Steps A
II: Heating Plate III: Solution of a Dispersing Aid (such as a Cationic Copolymer/Hydroxy Ethyl Cellulose)
IV: Upconcentrated PCC Slurry The following are optional and/or preferred features in Steps A, to be taken alone or in combination.

The carbonation gas flow rate is preferably selected in the range of 1 to 30, preferably 10 to 20, most preferably around 19.7 liters per minute at standard temperature and pressure per kilogram calcium hydroxide during precipitation. Said carbonation gas is $CO_2$ or a mixture of $CO_2$ and one or more other gases, such as air and/or nitrogen.

The slurry of calcium hydroxide is most preferably treated by a combination of magnesium sulphate and aluminium sulphate, or a combination of magnesium sulphate and zinc sulphate.

According to less preferred options, zinc sulphate can be added to the combination of magnesium sulphate and aluminium sulphate, or aluminium sulphate can be added to the combination of magnesium sulphate and zinc sulphate.

The addition of magnesium sulphate is most preferably performed before carbonation. Magnesium sulphate can be added, in a less preferred option, either before the addition of other sulphates or during that addition. In a second, less preferred option, magnesium sulphate can be added during carbonation along with aluminium and/or zinc sulphate. As a least preferred option of the invention, magnesium sulphate can be added during carbonation or just at the beginning of carbonation.

The addition of aluminium sulphate and/or zinc sulphate most preferably takes place over the period of carbonation.

The addition of the acid, namely sulphuric acid, most preferably in the form of a 10% by weight solution of sulphuric acid, takes place preferably at the beginning of carbonation. Still more preferably, however, the addition of sulphuric acid takes place simultaneously with the addition of aluminium sulphate or zinc sulphate.

Without being bound by any theory, the applicant is of the opinion that in the present invention, the presence, as described below: of sulphuric acid is necessary for achieving proper results.

In all the above options, sulphates of Group II and/or III can be added in addition to aluminium sulphate and/or zinc sulphate, or as a substitute for aluminium sulphate and/or zinc sulphate.

The temperature in the carbonation tank is observed to rise up to between 40 and 80° C., preferably up to between 50 and 60° C., most preferably up to between 56 and 57° C.

Removal of residual impurities and/or non-reactive unburnt lime takes place on a 45 μm mesh screen when the Brookfield viscosity of the material exiting from the carbonation tank is sufficiently low, namely less than 100 mPas at 100 rpm.

The final slurry product substantially consists of stable, porous agglomerates/aggregates.

The following are optional and/or preferred features in Steps B, to be taken alone or in combination.

By "deagglomeration/deaggregation" it is meant that the agglomerates/aggregates obtained at the end of Steps A by the specific process of the invention are disintegrated, the disintegrated product being ultrafine PCC of the same kind (with the exception of the contained or deposited metal salts) as the one obtained in U.S. patent '086.

By "gentle or mild conditions" it is meant that the deagglomeration/deaggregation of the agglomerates/aggregates is kept to a minimum, so that said agglomerates/aggregates are not "substantially destroyed". More precisely, this means that it is most preferred that during the upconcentration steps, the increase of surface area is limited to less than 50%, preferably less than 25%, and/or the increase in the fraction of particles below 2 μm is limited to less than 50%, preferably less than 25%, most preferably less than 10%, and/or the decrease of the mean aggregate diameter is limited to less than 50%, preferably less than 20%, most preferably less than 15%, as measured according to the means described below.

SEM images before and after upconcentration are substantially identical which means that the existing agglomerates/aggregates (as obtained in Step A "precursor") are not noticeably altered during upconcentration.

The upconcentration step can be performed in the form of any thermal or mechanical separation technology for solid/liquid suspensions provided the aggregates/agglomerates obtained in Steps A ("precursor") are sufficiently stable and are not "substantially destroyed" by said technology.

During the upconcentration process, a common dispersant is added in the customary proportions, in order to increase the slurry solids content without overly increasing the viscosity of the slurry. Said dispersant may be cationic, anionic or a combination thereof. The amount of dispersant added is controlled so that the PCC agglomerates/aggregates of the precursor are just coated, this quantity corresponding that added prior to a slurry viscosity increase. For example, approximately 5 to 9% w/w of a 40% solution of a sodium salt of polyacrylic acid relative to dry calcium carbonate is added to the slurry containing the pigment of the invention, corresponding to approximately 1.5 to 3.5% weight dry polyacrylic acid on dry calcium carbonate.

Most preferably the upconcentration is performed in a centrifuge, or a pressurized filter, or vacuum filtration or by thermal upconcentration, in the presence of a cationic, anionic or combination dispersant. The final slurry concentration is about 39 to 40% solids by weight.

A degree of destruction of the agglomerates/aggregates was expected. Such pigment aggregates/agglomerates are often held together by relatively weak Van der Waals or electrostatic attractive forces, which are surpassed by the centrifugal and/or shear forces created within the equipment associated with commercial upconcentration, namely within the centrifuge, fast-rotating decanter or high pressure filter press. The result that no noticeable destruction of aggregates/agglomerates is observed while fully achieving the degree of required upconcentration is therefore entirely not obvious.

The present invention covers the stable, porous aggregates/agglomerates of PCC produced at the end of Steps A alone ("precursor"), and the final stable, porous aggregates/agglomerates of PCC, as obtained by the above processes, at the end of Steps A in combination with Steps B, said PCC featuring quite innovative properties which in turn make it of particular value for inkjet applications.

The stable, porous aggregates/agglomerates of PCC obtained at the end of Steps A as well as those obtained after the upconcentration Steps B can be characterized by a selection of the following: a specific surface area of 30 to 100 m$^2$/g, preferably 50 to 80 m$^2$/g, and/or a mean aggregate diameter of 1 to 5 Mm, with an average diameter of 2 μm, and/or a fraction of fines below 2 μm of less than 20%, preferably of less than 15%, and/or a primary acicular particle size of 20 to 50 nm, with an aspect ratio between 1:2 and 1:10, and/or a solids content, by weight from 5 to 25%, preferably 15 to 20% at the end of Steps A, and a solids content of 25 to 60%, preferably 35 to 50% solids, in particular 39 to 40% solids at the end of Steps B.

The final slurry concentration may be partially or wholly obtained by the addition of one or more additional pigments or pigment slurries during Steps B.

The invention covers the novel pigments characterized in that they comprise stable, porous PCC aggregates/agglomerates as described herein, and novel pigment or PCC slurries characterized in that they comprise stable, porous PCC aggregates/agglomerates as described herein.

The invention also covers novel pigments and PCC slurries characterized in that their solids concentration is, by weight, from 5 to 25%, preferably 15 to 20% solids at the end of Steps A, and from 25 to 60%, preferably 35 to 50%, in particular 39 to 40% solids at the end of Steps B.

According to a preferred embodiment, the functional pigment or pigment slurry with a high surface area and integrated cations, is incorporated in the coating formulation in a way known to the skilled man, in order to increase namely the optical density upon printing without an increase in bleeding or feathering: this is one of the major achievements of the invention.

The invention therefore also covers novel coating formulations for the paper making industry characterized in that they comprise novel aggregates/agglomerates of PCC, novel pigments and/or novel slurries described herein.

The invention also covers coating formulations as described herein characterized in that the PCC slurry which it contains features the following properties: a solids content of 25 to 60%, preferably 35 to 50%, in particular around 39 to 40% weight, and/or a high surface area PCC, namely featuring a specific surface area of 30 to 100 m$^2$/g, preferably 50 to 80 m$^2$/g.

The invention also covers the applications of the coating formulations according to any of claims 19 or 20 relating to the coating of inkjet paper, namely to the coating of "multi-purpose" inkjet paper or of specialty, high quality, paper.

To sum up, the most preferred invention and best mode as of today relies on the selection of a decisively reduced carbonation gas flow rate during the precipitation of the PCC, the specific combination of cations introduced in the PCC crystal lattice during PCC synthesis, the use of a high solids coating slurry, upconcentrated after the synthesis with dispersant to 25 to 60%, preferably 35 to 50%, in particular around 39 to 40% solids by weight, in particular for use in paper coatings to be coated on MSP or Film Press, the use a high surface area PCC in the range of 30 to 100 m$^2$/g, preferably 50 to 80 m$^2$/g, at the end of Steps A and/or at the end of Steps B, most preferably at the end of step B, the use of small diameter PCC primary crystals, agglomerated/aggregated to form a porous PCC agglomerate.

As surface area is a function of particle size distribution, this distribution will have to be set accordingly.

The resulting functional pigment surface chemistry ensures an increased ink dye fixation and increased pigment surface area resulting in increased optical density, or a lower cationic additive demand in coating formulation for an equal optical density. No increase or even a decrease in bleeding and/or feathering relative to commercial alternatives is observed.

The possibility of obtaining a high solids content slurry with the invention pigment leads to better runnability when incorporated in a paper coating formulation and coated on a coater, such as a MSP (less build-up on MSP rolls). The high solids content leads to less drying energy demand and easier and faster drying; a higher paper machine speed is possible without an increase in deposits on the rolls in paper machine after-drying section.

The invention leads to a high solids content coating slurry meaning that less energy must be introduced during the drying step, thereby reducing the cost.

Further the use of the inventive aggregates/agglomerates limits the quantity of binder needed, thereby limiting cost.

Because the invention will favour agglomerates/aggregates, the applications will be limited to matt inkjet paper applications. The invention agglomerates/aggregates are too coarse to obtain a glossy finish.

Various processes of the invention will be better understood through the following description and the following non-limiting examples.

EXAMPLES

Examples of Preparations of the Innovative Inkjet Pigment and Pigment Data for the Corresponding Products Examples 1, 5 and 7 were prepared according to Steps A of the invention. Examples 2, 3, 4, 6, 8 and 9 were upconcentrations of one of Examples 1 5 and 7, upconcentrated according to the invention (Steps B).

Example 1

Process of the Invention, Steps a with Magnesium Sulphate and Zinc Sulphate 150 kg of quicklime were added to 1300 liters of tap water in a stirred reactor. Before lime addition the water temperature was adjusted to 40° C.

The quicklime was slaked for 25 minutes under continuous stirring and the resulting slurry of calcium hydroxide ("milk of lime") at 13.1% w/w solids was then screened on a 100 μm screen.

The calcium carbonate precipitation was conducted to a 1000 liter baffled cylindrical stainless steel reactor equipped with an gasing agitator having a gas dispersion unit, a stainless steel carbonation tube to direct a carbon dioxide/air gas stream to the impeller, and probes for monitoring the pH and conductivity of the suspension.

700 liters of the calcium hydroxide suspension obtained in the slaking step as stated above were added to the carbonating reactor and the temperature of the reaction mixture was adjusted to the desired starting temperature of 20° C.

Prior to carbonation, 30 kg of 10% w/w aqueous solution of magnesium sulphate ($MgSO_4 \cdot 7H_2O$) was added to the milk of lime.

The agitator was then adjusted to 1480 rpm, and the slurry was carbonated by passing a gas mixture of 26 volume percent carbon dioxide in air at 118 $Nm^3/h$, corresponding to 19.7 liters per minute at standard temperature and pressure per kilogram of calcium hydroxide, through the slurry. During carbonation, 100 kg of 10% w/w aqueous solution of zinc sulphate ($ZnSO_4 \cdot 7H_2O$) and 30 kg of 0.10% w/w aqueous solution of sulphuric acid were added to the reaction mixture in a continuous manner over the total carbonation time.

Completion of carbonation was reached after 1 hour, 55 minutes reaction time and indicated by a drop in conductivity to a minimum accompanied by a drop in pH to a constant value below 8.0.

During carbonation, the slurry temperature was allowed to rise due to the exothermic nature of the reaction to a final slurry temperature of 57° C.

The residual impurities and/or non-reactive unburnt lime were then removed by passing the aqueous slurry through a 45 μm screen.

The product of the above carbonation was an aqueous suspension of 15.6% w/w solids content of ultrafine primary calcium carbonate particles bound together to form stable porous spherical aggregates.

The single crystals as constituents of the aggregates featured a particle diameter of 20 to 50 nm and an aspect ratio between 1:2 and 1:10 according to SEM pictures. The porous aggregates formed from these single crystals showed diameters between 1 to 5 μm, with an average diameter of 2 μm, also according to SEM pictures.

Pigment data of the product obtained in the process described above are listed as Example 1 in Table 2.

The table results for Example 1 confirm the high aggregate/agglomerate surface area and appropriate aggregate/agglomerate dimensions, but an insufficient solids content for subsequent coating applications. Indeed, the results of a coating trial with a low solids formulation run according to the general coating conditions described hereafter, demonstrate that for an equal solids addition per paper surface area, coating with a lower solids formulation leads to a decrease in optical density (Table 1).

It is therefore necessary to upconcentrate without a noticeable loss or degradation of aggregates.

TABLE 1

Effect of total slurry solids content on 100% black optical density

| Total slurry solids content (% wt) | Metal sulphate in the total slurry solids (% wt) | Metal Sulphate type | 100% Black optical density |
|---|---|---|---|
| 13.7 | 10 | $ZnSO_4 \cdot 7H_2O$ | 2.44 |
| 36.7 | 10 | $ZnSO_4 \cdot 7H_2O$ | 2.72 |

Example 2

Process of the Invention, Upconcentration (Steps B) of the Product of Example 1

2210 g of the precipitated calcium carbonate slurry obtained according to process Steps A as described in Example 1 were cooled to 25° C. and dewatered in Steps B using a pressurized filter.

One obtains a filter cake of about 43% w/w solids.

The filtrate was collected and used for redispersion of the filter cake.

50 g of filtrate obtained in dewatering step as described above was added in a 1 liter dispersing unit equipped with an impeller and mixed with 16 g of a 40% w/w solution of a sodium salt of polyacrylic acid as dispersant.

Into this mixture, the filtercake having 57% w/w residual moisture content, as obtained in dewatering step described above, was added stepwise into the dispersing unit under continuous mixing.

After each addition of filter cake and subsequent homogenization, the slurry Brookfield viscosity at 100 rpm was determined. The addition of filter cake was stopped when the Brookfield viscosity reached a defined maximum limit of approximately 1000 mPas.

At this point 680 g of filter cake had been added.

The product of the upconcentration process described above was an aqueous suspension with 39.9% w/w solids content ultrafine primary calcium carbonate particles bound together to form stable porous spherical aggregates of 1 to 5 µm.

The crystalline structure of the product was determined by SEM pictures.

Pigment data of the product obtained in the process described above are listed as Example 2 in Table 2.

From these data it can be seen that the obtained pigment features a high BET specific surface area value, which shows that one has obtained the high surface needed to interact and bind the ink, along with appropriate aggregate/agglomerate dimensions (1 to 2 µm according to SEM) and yellowing index.

The final product additionally features a sufficient solids content for subsequent ink jet paper coating applications.

Example 3

Process of the Invention, Upconcentration (Steps B) of the Product of Example 1

2210 g of the precipitated calcium carbonate slurry obtained according to the process described in Example 1 were cooled to 25° C. and dewatered using a pressurized filter. The filtrate was collected and used for later redispersion of filter cake.

30 g of filtrate obtained in dewatering step as described above was added to a 1 liter dispersing unit equipped with an impeller and mixed with 6.4 g of a 35% w/w solution of Sodium Citrate and 100 g of a 6% w/w solution of sodium salt of Carboxy Methyl Cellulose (CMC) as dispersant.

Into this mixture, filtercake having residual moisture of 57% w/w obtained in dewatering step described above was added stepwise to the dispersing unit under continuous mixing. After each addition of filter cake and subsequent homogenization, the slurry Brookfield viscosity at 100 rpm was determined. The addition of filter cake was stopped when the Brookfield viscosity reached a defined maximum limit of approximately 1000 mPas.

At this moment 590 g of filter cake had been added.

The product of the upconcentration process described above was an aqueous suspension with 36.1% w/w solids content of ultrafine primary calcium carbonate particles bound together to form stable porous spherical aggregates.

The crystalline structure of the product was determined by SEM pictures.

Pigment data of the product obtained in the process described above are listed as Example 3 in Table 2.

The results call for the same comments as in Example 2.

Example 4

Process of the Invention, PCC Production (Step a, Option Magnesium Sulphate and Zinc Sulphate) and Upconcentration (Steps B)

150 kg of quicklime were added to 1300 liters of tap water in a stirred reactor. Before lime addition, the water temperature was adjusted to 40° C.

The quicklime was slaked for 25 minutes under continuous stirring and the resulting slurry of calcium hydroxide ("milk of lime") at 12.8% w/w solids was then screened on a 100 µm screen.

The calcium carbonate precipitation was conducted to a 1000 liter baffled cylindrical stainless steel reactor equipped with an gasing agitator having a gas dispersion unit, a stainless steel carbonation tube to direct a carbon dioxide/air gas stream to the impeller, and probes for monitoring the pH and conductivity of the suspension.

700 liters of the calcium hydroxide suspension obtained in the slaking step as stated above were added to the carbonating reactor and the temperature of the reaction mixture was adjusted to the desired starting temperature of 20° C.

Before the start of carbonation, 30 kg of 10% w/w aqueous solution of magnesium sulphate ($MgSO_4 \cdot 7H_2O$) was added to the milk of lime.

The agitator was then adjusted to 1480 rpm, and the slurry was carbonated by passing a gas mixture of 26 volume percent carbon dioxide in air at 118 $Nm^3$/h, corresponding to 19.7 liters per minute at standard temperature and pressure per kilogram of calcium hydroxide, through the slurry.

During carbonation 100 kg of 10% w/w aqueous solution of zinc sulphate ($ZnSO_4 \cdot 7H_2O$) and 30 kg of 10% w/w aqueous solution of sulphuric acid were added continuously over total carbonation time to the reaction mixture.

Completion of carbonation was reached after 1 hour, 50 minutes reaction time and indicated by a drop in conductivity to a minimum accompanied by a drop in pH to a constant value below 8.0.

During carbonation slurry temperature was allowed to rise resulting in a final slurry temperature of 58° C. due to the heat generated during the exothermic reaction.

Upconcentration Step:

The slurry was then screened on a 45 µm screen before being fed to a dewatering centrifuge (operating at 4440 rpm) at a rate of 350 l/h. To the upconcentrated filtercake discharged by the dewatering centrifuge 4.75% W/W of a 40% w/w solution of a sodium salt of polyacrylic acid as dispersing aid was added in a continuous manner. The mixture was then redispersed in a mixing unit and the upconcentrated product was recovered as an aqueous slurry of the pigment.

Product of the carbonation and upconcentration steps as stated above was an aqueous suspension of 39% w/w solids content of ultrafine primary calcium carbonate particles bound together to form stable porous spherical aggregates. The single crystals as constituents of the aggregates had acicular particle shape with a diameter of 20 to 50 nm and aspect ratios between 1:2 and 1:10. The porous aggregates formed from these single crystals showed diameters between 1 and 5 µm, with an average diameter of 2 µm.

The crystalline structure of the product was determined by SEM pictures.

Pigment data of the product obtained in the process described above are listed as Example 4 in Table 2.

The results call for the same comments as Examples 2 and 3.

Example 5

Process of the Invention, Steps A, Option Magnesium Sulphate and Aluminium Sulphate 1.15 kg of quicklime were added to 1000 liters of tap water in a stirred reactor. Before lime addition the water temperature was adjusted to 40° C.

The quicklime was slaked for 25 minutes under continuous stirring and the resulting slurry of calcium hydroxide ("milk of lime") at 12.7% w/w solids was then screened on a 100 µm screen.

The calcium carbonate precipitate was conducted in a 1000 liter baffled cylindrical stainless steel reactor equipped with an gasing agitator having a gas dispersion unit, a stainless steel carbonation tube to direct a carbon dioxide/air gas stream to the impeller, and probes for monitoring the pH and conductivity of the suspension.

700 liters of the calcium hydroxide suspension obtained in the slaking step as stated above were added to the carbonating reactor and the temperature of the reaction mixture was adjusted to the desired starting temperature of 20° C.

Before the start of carbonation, 30 kg of 10% w/w aqueous solution of magnesium sulphate ($MgSO_4 \cdot 7H_2O$) was added to the milk of lime.

The agitator was then adjusted to 1480 rpm, and the slurry was carbonated by passing a gas mixture of 26 volume percent carbon dioxide in air at 118 $Nm^3/h$, corresponding to 19.7 liters per minute at standard temperature and pressure per kilogram of calcium hydroxide, through the slurry.

During carbonation, 100 kg of 10% w/w aqueous solution of aluminium sulphate ($Al_2(SO_4)_3 \cdot 18H_2O$) and 30 kg of 10% w/w aqueous solution of sulphuric acid were added continuously to the reaction mixture over the total carbonation time.

Completion of carbonation was reached after 1 hour, 48 minutes reaction time and indicated by a drop in conductivity to a minimum accompanied by a drop in pH to a constant value below 8.0.

During carbonation, the slurry temperature was allowed to rise resulting in a final slurry temperature of 61° C. due to the heat generated during the exothermic reaction.

The slurry was then screened on a 45 μm screen and the product recovered as an aqueous slurry of the pigment.

The product of the carbonation step described above was an aqueous suspension with 14.3% w/w solids content of ultrafine primary calcium carbonate particles bound together to form stable porous spherical aggregates.

The single crystals as constituents of the aggregates featured acicular particle shapes with a diameter of 20 to 50 nm and aspect ratios between 1:2 and 1:10.

The porous aggregates formed from these single crystals showed diameters between 1 to 5 μm, with an average diameter of 2 μm.

The crystalline structure of the product was determined by SEM pictures.

Pigment data of the product obtained in the process described above are listed as Example 5 in Table 2.

Example 6

Process of the Invention, Upconcentration (Steps B) of the Product of Example 5

10 liters of the precipitated calcium carbonate slurry obtained according to process described in Example 5 were screened on a 45 Mm screen prior to being fed to a thermal evaporator. The evaporator consisted of a cylindrical stainless steel vessel equipped with an agitator and a double mantle heating unit operating with 120° C. hot synthetic oil as heating media.

Prior to evaporation 8.5% w/w of a 40% w/w solution of a sodium salt of polyacrylic acid as dispersing aid was added to the precipitated calcium carbonate slurry and mixed in.

Thermal upconcentration was achieved through evaporation in said lab evaporator under atmospheric pressure at slurry temperatures ranging from 90 to 95° C.

The evaporation was stopped when the Brookfield viscosity reached defined maximum limit of approximately 1000 mPas.

The product of the upconcentration process described above was an aqueous suspension with 35.5% w/w solids content of ultrafine primary calcium carbonate particles, bound together to form stable porous spherical aggregates.

The crystalline structure of the product was determined by SEM pictures.

Pigment data of the product obtained in the process described above are listed as Example 6 in Table 2.

Example 7

Process of the Invention, Steps A (Option Magnesium Sulphate and Zinc Sulphate)

115 kg of quicklime were added to 1000 liters of tap water in a stirred reactor. Before lime addition the water temperature was adjusted to 40° C.

The quicklime was slaked for 25 minutes under continuous stirring and the resulting slurry of calcium hydroxide ("milk of lime") at 12.5% w/w solids was then screened on a 100 μm screen.

The calcium carbonate precipitate was conducted to a 1000 liter baffled cylindrical stainless steel reactor equipped with an gasing agitator having a gas dispersion unit, a stainless steel carbonation tube to direct a carbon dioxide/air gas stream to the impeller, and probes for monitoring the pH and conductivity of the suspension.

700 liters of the calcium hydroxide suspension obtained in the slaking step as stated above were added to the carbonating reactor and the temperature of the reaction mixture was adjusted to the desired starting temperature of 20° C.

Before the start of carbonation, 30 kg of 10% w/w aqueous solution of magnesium sulphate ($MgSO_4 \cdot 7H_2O$) was added to the milk of lime.

The agitator was then adjusted to 1480 rpm, and the slurry was carbonated by passing a gas mixture of 26 volume percent carbon dioxide in air at 118 $Nm^3/h$, corresponding to 19.7 liters per minute at standard temperature and pressure per kilogram of calcium hydroxide, through the slurry.

During carbonation, 100 kg of 10% w/w aqueous solution of zinc sulphate ($ZnSO_4 \cdot 7H_2O$) and 30 kg of 10% w/w aqueous solution of sulphuric acid were added continuously to the reaction mixture over the total carbonation time.

Completion of carbonation was reached after 1 hour, 43 minutes reaction time and indicated by a drop in conductivity to a minimum accompanied by a drop in pH to a constant value below 8.0.

During carbonation, the slurry temperature was allowed to rise resulting in a final slurry temperature of 62° C. due to the heat generated during the exothermic reaction.

The slurry was then screened on a 45 μm screen and the product recovered as an aqueous slurry of the pigment.

The product of the carbonation step described above was an aqueous suspension with 13.7% w/w solids content of ultrafine primary calcium carbonate particles bound together to form stable porous spherical aggregates.

The single crystals as constituents of the aggregates featured acicular particle shapes with a diameter of 20 to 50 nm and aspect ratios between 1:2 and 1:10.

The porous aggregates formed from these single crystals showed diameters between 1 and 5 μm, with an average diameter of 2 μm.

The crystalline structure of the product was determined by SEM pictures.

Pigment data of the product obtained in the process described above are listed as Example 7 in Table 2.

These results call for the same comments as for Example 1.

Example 8

Process of the Invention, Upconcentration (Steps B) of the Product of Example 7

10 liters of the precipitated calcium carbonate slurry obtained according to the process described in Example 7 were screened on a 45 μm screen prior to being fed to a thermal evaporator. The evaporator consisted of a cylindrical stainless steel vessel equipped with an agitator and a double mantle heating unit operating with 120° C. hot synthetic oil as heating media.

Prior to evaporation 8.5% w/w of a 40% w/w solution of a sodium salt of polyacrylic acid as dispersing aid was added to the precipitated calcium carbonate slurry and mixed in.

Thermal upconcentration was achieved through evaporation in said lab evaporator under atmospheric pressure at slurry temperatures ranging from 90 to 95° C.

The evaporation was stopped when the Brookfield viscosity reached a defined maximum limit of approximately 1000 mPas.

The product of the upconcentration process described above was an aqueous suspension with 36.7% w/w solids content of ultrafine primary calcium carbonate particles, bound together to form stable porous spherical aggregates.

The crystalline structure of the product was determined by SEM pictures.

Pigment data of the product obtained in the process described above are listed as Example 8 in Table 2.

Example 9

Process of the Invention, PCC Production (Steps A, Option Magnesium Sulphate and Zinc Sulphate) and Upconcentration (Steps B)

115 kg of quicklime were added to 1000 liters of tap water in a stirred reactor. Before lime addition, the water temperature was adjusted to 40° C.

The quicklime was slaked for 25 minutes under continuous stirring and the resulting slurry of calcium hydroxide ("milk of lime") at 13.5% w/w solids was then screened on a 100 μm screen.

The calcium carbonate precipitation was conducted to a 1000 liter baffled cylindrical stainless steel reactor equipped with an gasing agitator featuring a gas dispersion unit, a stainless steel carbonation tube to direct a carbon dioxide/air gas stream to the impeller, and probes for monitoring the pH and conductivity of the suspension.

700 liters of the calcium hydroxide suspension obtained in the slaking step as stated above, were added to the carbonating reactor and the temperature of the reaction mixture was adjusted to the desired starting temperature of 20° C.

Before the start of carbonation, 30 kg of 10% w/w aqueous solution of magnesium sulphate ($MgSO_4 \cdot 7H_2O$) was added to the milk of lime.

The agitator was then adjusted to 1480 rpm, and the slurry was carbonated by passing a gas mixture of 26 volume percent carbon dioxide in air at 118 $Nm^3/h$, corresponding to 19.7 liters per minute at standard temperature and pressure per kilogram of calcium hydroxide, through the slurry. During carbonation, 100 kg of 10% w/w aqueous solution of zinc sulphate ($ZnSO_4 \cdot 7H_2O$) and 30 kg of 10% w/w aqueous solution of sulphuric acid were added continuously to the reaction mixture over the total carbonation time.

Completion of carbonation was reached after 1 hour, 44 minutes reaction time and indicated by a drop in conductivity to a minimum accompanied by a drop in pH to a constant value below 8.0.

During carbonation, the slurry temperature was allowed to rise resulting in a final slurry temperature of 56° C. due to heat generated during the exothermic reaction.

The slurry was then screened on a 45 μm screen.

Upconcentration Step:

The screened slurry was then fed at a rate of 400 l/h to a dewatering centrifuge operating at 4440 rpm. To the upconcentrated filtercake discharged by the dewatering centrifuge, 6% w/w of a 40% w/w solution of a sodium salt of polyacrylic acid as dispersing aid was added in a continuous manner.

The mixture was then redispersed in a mixing unit and the upconcentrated product was recovered as an aqueous slurry of the pigment.

The product of the carbonation and upconcentration steps described above was an aqueous suspension with 39.9% w/w solids content of ultrafine primary calcium carbonate particles, bound together to form stable porous spherical aggregates. The single crystals as constituents of the aggregates had acicular particle shape with a diameter of 20 to 50 nm and aspect ratios between 1:2 and 1:10. The porous aggregates formed from these single crystals showed diameters between 1 and 5 μm with an average diameter of 2 μm.

The crystalline structure of the product was determined by SEM pictures.

Pigment data of the product obtained in the process described above are listed as Example 9 in Table 2.

In Table 2, specific surface area (SSA) was measured using a Tristar 3000 Analyzer, particle size distribution (PSD) using a Helos Sympatec, brightness using a Datacolor Elrepho 3000 Jerics, solids content using a Mettler Toledo HB43 Halogen balance, and viscosity using a Brookfield DVII Viscometer, all according to the recommendations of the manufacturer.

TABLE 2

Characteristics of the Pigments and Pigment-Containing Slurries of the Invention
(all upconcentrations with anionic, cationic or combination dispersants)

| Test | Unit | Example 1 | Example 2 | Example 3 | Example 4 | Example 5 | Example 6 | Example 7 | Example 8 | Example 9 |
|---|---|---|---|---|---|---|---|---|---|---|
| BET Specific Surface Area | m2/g | 58.9 | 69.0 | 64.2 | 71.2 | 59.5 | 64.1 | 75.2 | 68.4 | 62.8 |
| PSD (Helos Sympatec) | | | | | | | | | | |
| <2 μm | % | 31 | 38 | 38 | 33 | 16 | 20 | 12 | 16 | 36 |
| <1 μm | % | 8 | 11 | 11 | 9 | 5 | 6 | 4 | 4 | 10 |

TABLE 2-continued

Characteristics of the Pigments and Pigment-Containing Slurries of the Invention
(all upconcentrations with anionic, cationic or combination dispersants)

| Test | Unit | Example 1 | Example 2 | Example 3 | Example 4 | Example 5 | Example 6 | Example 7 | Example 8 | Example 9 |
|---|---|---|---|---|---|---|---|---|---|---|
| Average particle diameter d50 | μm | 2.72 | 2.40 | 2.41 | 2.62 | 3.73 | 3.39 | 4.25 | 3.81 | 2.49 |
| Brightness (DIN 53140) | | | | | | | | | | |
| R457 (ISO 2469) | % | 96.1 | 96.0 | 95.8 | 96.0 | 95.7 | 95.5 | 95.6 | 95.5 | 95.8 |
| Yellow index (DIN 6167) | | 1.5 | 1.5 | 1.7 | 1.3 | 1.6 | 1.7 | 1.6 | 1.5 | 1.5 |
| Solids content | % | 15.6 | 39.9 | 36.1 | 39.0 | 14.3 | 35.5 | 13.7 | 36.7 | 39.9 |
| Viscosity | mPas | 34 | 1030 | 920 | 770 | 33 | 765 | 22 | 720 | 994 |

Coating Trials

A selection of the above products of the invention were introduced in paper coating slurries and coated onto paper.

Coating Trials Based on Example 4, 6 and 8 Slurries

Three paper coating slurries were prepared, each using one of three PCC slurries prepared according to the invention, along with standard additives. Emox TSC is an oxidized potato starch from Emsland-Staerke GmbH, Basoplast PR8172 is a binder from BASF, Catiofast CS is a Poly-Dadmac cationic additive from BASF, and Lupamin 6005 is a polyvinyl-formamide from BASF.

TABLE 3

Coating formulation compositions (by parts)

| Coating Slurry | Solids content (% w/w) | Coating Slurry 1 | Coating Slurry 2 | Coating Slurry 3 |
|---|---|---|---|---|
| PCC Slurry of the Invention | | | | |
| Example 4 | 39.0 | 100 | | |
| Example 6 | 35.5 | | 100 | |
| Example 8 | 36.7 | | | 100 |
| Additives | | | | |
| Emox TSC (Emsland-Staerke GmbH) | 40 | 25 | | |
| | 35 | | 25 | 25 |
| Basoplast PR8172 (BASF) | 40 | 10 | 10 | 10 |
| Catiofast CS (BASF) | 33 | 10 | | |
| | 30 | | 10 | 10 |
| Lupamin 6005 (BASF) | 30 | 1 | 1 | 1 |
| Final Coating Slurry Characteristics | | | | |
| Final solids content | % | 37.5 | 35.7 | 36.6 |
| Final slurry pH | — | 9.0 | 8.3 | 8.4 |
| Brookfield viscosity at 20° C. | mPas | 160 | 580 | 460 |

Two additional paper coating slurries were prepared, each using one of two PCC slurries prepared according to the invention, along with another selection of standard additives (Mowiol 26-88, Printofix Cartafix VXT01 and Cartabond TS1 from Clariant).

TABLE 4

Coating formulation compositions (by parts)

| Coating Slurry | Solids content (% w/w) | Coating Slurry 4 | Coating Slurry 5 |
|---|---|---|---|
| PCC Slurry of the Invention | | | |
| Example 6 | 36.7 | 100 | |
| Example 8 | 35.4 | | 100 |

TABLE 4-continued

Coating formulation compositions (by parts)

| Coating Slurry | Solids content (% w/w) | Coating Slurry 4 | Coating Slurry 5 |
|---|---|---|---|
| Additives | | | |
| Mowiol 26-88 | 7.6 | 12 | 12 |
| Printofix | 43.0 | 5 | 5 |
| Cartafix VXT01 | 20.0 | 3 | 3 |
| Cartabond TS1 | 43.0 | 1.5 | 1.5 |
| Final Coating Slurry Characteristics | | | |
| Final slurry pH | — | 8.3 | 8.0 |
| Final slurry solids content | % | 27.8 | 27.8 |
| Final slurry Brookfield viscosity at 20° C. | mPas | 300 | 100 |

Coating Slurry 1 was then coated simultaneously on both sides of a base paper, which is described in Table 5, using the Jagenberg MSP under the conditions listed in Table 6.

TABLE 5

Characteristics of the base paper coated using Coating Slurry 1

| | |
|---|---|
| Grammage: | 84.1 g/m² |
| Filler content (otro): | 23.9% |
| Tension length: | 4.75 km |
| Surface contact angle OS (1σ): | 112.2 |
| Surface contact angle OS (10σ): | 106.6 |
| Yellow index OS: | −25.6% |

TABLE 6

Coating Machine Conditions on the Jagenberg MSP using Coating Slurry 1

| | |
|---|---|
| Coating speed: | 560 m/min |
| Coating application weight: | 9.8-10.8 g/m² |
| Coating Moisture content: | 5.2-5.4% |
| Coating colour temperature during coating: | 28° C. |

| Coating heads | Left | Right |
|---|---|---|
| Type of coating rod: | C25 | C25 |
| Coating rod speed: | 200 rpm | 200 rpm |
| Coating rod pressure: | 1.5 bar | 1.5 bar |
| Pumping speed: | 60 rpm | 60 rpm |
| Pumping pressure: | 0.8 bar | 1.1 bar |

TABLE 6-continued

Coating Machine Conditions on the Jagenberg MSP using Coating Slurry 1

Calendering

| | |
|---|---|
| Number of NIPS: | 1 |
| Calendering speed: | 200 m/min |
| Calendering pressure: | 65 kN/m |
| Calendering temperature: | 60° C. |

Coating Slurries 2, 3, 4 and 5 were coated on one side of a base paper, which is described in Table 7, using the K-Coater under the conditions listed in Table 8.

TABLE 7

Characteristics of the base paper coated in Coating Slurries 2, 3, 4 and 5

| | |
|---|---|
| Grammage | 89.2 g/m$^2$ |
| Filler content (otro) | 12.9% |
| Tension length | 5.26 km |
| Surface contact angle OS (1σ) | 109.3 |
| Surface contact angle OS (10σ) | 106.4 |
| Yellow index Os | −18.3% |

TABLE 8

Coating Machine Conditions on a K-Coater with a grooved rod for Coating Slurries 2, 3, 4 and 5

| | |
|---|---|
| Coating application weight | 8 g/m$^2$ |
| Coating Moisture content | 5% |
| Coating colour temperature during coating | 23° C. |
| Paper drying conditions | Dried in a lab oven at 80° C. for 4 minutes |

Ink Jet Printing Trials

Printing trials on three different inkjet printers, namely the Epson Stylus Photo 950, the HP Deskjet 5550 and the Canon i950, were used to compare the inkjet printability of the papers coated with the pigments of the invention as opposed to market inkjet papers. The printing test cards were designed to assess the optical density, as well as the degree of feathering and bleeding.

The HP Bright White and Epson S041214 papers are marketed as a multipurpose inkjet papers. The Zweckform 2585 and Epson S041061 papers are considered to represent high quality matt inkjet papers, offering a higher print quality than standard multipurpose inkjet papers.

Optical density was measured using the Gretag D 186 densitometer according to the standard procedures indicated by the manufacturer. For an equal quantity of applied ink, the higher the optical density, the better the coating maintains the dyes on the paper surface.

Paper Coated with Coating Slurry 1:

The following coating trial (Coating Trial 1) was performed coating Coating Slurry 1, which was based on the PCC slurry of Example 4, on the base paper as described above.

Bleeding and feathering on a first type of printing test card were measured using PapEye instrumentation from ONLY Solution GmbH according to the standard procedures given by the manufacturer. The lower the measured value, the better the bleeding and feathering.

TABLE 9

Optical Density and Bleeding/Feathering Results of Paper Coated with the Coating Pigment of the Invention, as Opposed to Market Papers

| | Optical density Gretag-Macbeth D186 | | | | | | | | | |
|---|---|---|---|---|---|---|---|---|---|---|
| Printer type Epson stylus photo 950 | black 100% | black 80% | cyan (c), 100% | magenta (m) 100% | yellow (y), 100% | Green, c 100% y 100% | Blue, m 100% c 100% | Red, y 100% m 100% | Bleed- ing | Feath- ering |
| Zweckform 2585 | 2.28 | 2.04 | 1.73 | 1.47 | 1.23 | 1.37 | 1.75 | 1.39 | 300.45 | 448.56 |
| Epson S041061 | 2.29 | 2.02 | 1.58 | 1.42 | 1.11 | 1.31 | 1.70 | 1.36 | 304.52 | 460.76 |
| HP Bright White | 1.92 | 1.71 | 1.31 | 1.26 | 1.08 | 1.15 | 1.43 | 1.16 | 348.71 | 539.46 |
| Epson S041214 | 1.58 | 1.39 | 0.97 | 1.02 | 0.89 | 0.89 | 1.11 | 0.93 | 350.40 | 532.80 |
| Coating Trial 1 | 1.99 | 1.78 | 1.20 | 1.32 | 1.12 | 1.15 | 1.46 | 1.27 | 348.53 | 519.42 |

The above table shows that the optical density obtained with the product of the invention is superior to comparable multipurpose market papers, and approaches the quality of a superior inkjet paper. The bleeding obtained with the product of the invention is equal or inferior to other equivalent market papers. The feathering obtained with the product of the invention is inferior to other market papers.

The improved optical density, bleeding and feathering attest to an improved balance of absorption/adsorption properties of the paper coating relative to competing market products.

Further, the pigment structure did not negatively influence runnability; the runnability was actually improved since less dry built-up on the MSP was observed.

TABLE 10

Optical Density and Bleeding/Feathering Results of Paper
Coated with the Coating Pigment of the Invention, as Opposed to
Market Papers

| Printer type HP Deskjet 5550 | black 100% | black 80% | cyan (c), 100% | magenta (m) 100% | yellow (y), 100% | Green, c 100% y 100% | Blue, m 100% c 100% | Red, y 100% m 100% | Bleed- ing | Feath- ering |
|---|---|---|---|---|---|---|---|---|---|---|
| Zweckform 2585 | 2.06 | 1.91 | 1.99 | 1.26 | 0.93 | 1.06 | 1.75 | 1.31 | 310.69 | 503.24 |
| Epson S041061 | 1.95 | 1.81 | 1.85 | 1.19 | 0.92 | 1.03 | 1.67 | 1.28 | 312.92 | 520.78 |
| HP Bright White | 2.35 | 2.05 | 1.71 | 1.17 | 0.94 | 1.04 | 1.56 | 1.32 | 319.51 | 494.86 |
| Epson S041214 | 1.85 | 1.68 | 1.39 | 1.01 | 0.83 | 0.89 | 1.28 | 1.02 | 331.35 | 514.59 |
| Coating Trial 1 | 2.57 | 2.35 | 1.86 | 1.23 | 1.01 | 1.08 | 1.69 | 1.19 | 314.12 | 510.20 |

The optical density results of the invention were superior to comparable market papers and in some cases higher quality inkjet papers as well. A decreased bleeding and similar degree of feathering relative to comparable and one of the higher quality papers was also noted.

Again, the pigment structure did not negatively influence runnability; the runnability was improved since little dry built-up on the film press was observed.

Papers Coated with Coating Slurries 2 and 3:

The following coating trials were performed using aluminium and zinc-based PCC slurries, each thermally upconcentrated. Coating the base paper with Coating Slurries 2 and 3 lead, respectively, to Coating Trial 2 and 3 results below. A second type of test card was used to evaluate optical density, bleeding and feathering.

TABLE 11

Optical Density and Bleeding/Feathering Results of Paper
Coated with the Coating Pigment of the Invention, as Opposed to
Market Papers

| Printer type Canon I950 | black 100% | black 95% | cyan (c), 100% | magenta (m) 100% | yellow (y), 100% | Green, c 100% y 100% | Blue, m 100% c 100% | Red, y 100% m 100% | Bleed- ing | Feath- ering |
|---|---|---|---|---|---|---|---|---|---|---|
| Zweckform 2585 | 2.21 | 1.95 | 1.41 | 1.84 | 1.00 | 0.99 | 2.16 | 1.59 | 299.66 | 470.13 |
| Epson S041061 | 2.17 | 1.82 | 1.22 | 1.75 | 0.91 | 0.96 | 1.90 | 1.55 | 303.97 | 479.14 |
| HP Bright White | 1.75 | 1.54 | 1.17 | 1.51 | 0.86 | 0.93 | 1.65 | 1.28 | 354.43 | 549.39 |
| Epson S041214 | 1.42 | 1.29 | 0.99 | 1.28 | 0.77 | 0.77 | 1.24 | 1.07 | 348.44 | 527.03 |
| Coating Trial 1 | 1.87 | 1.66 | 1.23 | 1.63 | 0.90 | 0.91 | 1.68 | 1.36 | 340.32 | 548.72 |

The optical density results of the invention were mostly superior to those of other comparable market papers, and approached the values given by superior quality papers. A decreased bleeding and similar degree of feathering relative to comparable market papers was noted.

Bleeding and feathering were measured using the Personal IAS® (Image Analysis System) instrumentation from Quality Engineering Association, Inc., according to the standard procedures given by the manufacturer. The lower the measured value, the better the bleeding and feathering.

TABLE 12

Optical Density and Bleeding/Feathering Results of Paper
Coated with the Coating Pigment of the Invention, as Opposed to
Market Papers

| Printer type Epson stylus photo 950 | black 100% | black 80% | cyan (c), 100% | magenta (m) 100% | yellow (y), 100% | Green, c 100% y 100% | Blue, m 100% c 100% | Red, y 100% m 100% | Bleed- ing | Feath- ering |
|---|---|---|---|---|---|---|---|---|---|---|
| Zweckform 2585 | 2.38 | 1.29 | 2.25 | 1.64 | 1.54 | 1.66 | 2.04 | 1.55 | 164.14 | 58.00 |
| Epson S041061 | 2.45 | 1.23 | 2.09 | 1.59 | 1.49 | 1.54 | 1.85 | 1.51 | 166.34 | 67.63 |
| HP Bright White | 2.09 | 1.08 | 1.72 | 1.42 | 1.34 | 1.32 | 1.61 | 1.31 | 239.20 | 104.37 |

TABLE 12-continued

Optical Density and Bleeding/Feathering Results of Paper Coated with the Coating Pigment of the Invention, as Opposed to Market Papers

| Printer type Epson stylus photo 950 | black 100% | black 80% | cyan (c), 100% | magenta (m) 100% | yellow (y), 100% | Green, c 100% y 100% | Blue, m 100% c 100% | Red, y 100% m 100% | Bleed-ing | Feath-ering |
|---|---|---|---|---|---|---|---|---|---|---|
| Coating Trial 2 | 2.21 | 1.13 | 1.81 | 1.69 | 1.58 | 1.25 | 1.49 | 1.67 | 216.30 | 74.91 |
| Coating Trial 3 | 2.30 | 1.19 | 1.84 | 1.78 | 1.62 | 1.32 | 1.57 | 1.68 | 209.09 | 89.94 |

The above table shows that the optical density obtained with the product of the invention is superior to comparable market papers, and sometimes surpassed even higher quality paper values. The bleeding obtained with the product of the invention is inferior to other equivalent market papers. The feathering obtained with the product of the invention is lower than other comparable market papers. The paper brightness was similar to market papers.

TABLE 13

Optical Density and Bleeding/Feathering Results of Paper Coated with the Coating Pigment of the Invention, as Opposed to Market Papers

| Printer type HP Deskjet 5550 | black 100% | black 80% | cyan (c), 100% | magenta (m) 100% | yellow (y), 100% | Green, c 100% y 100% | Blue, m 100% c 100% | Red, y 100% m 100% | Bleed-ing | Feath-ering |
|---|---|---|---|---|---|---|---|---|---|---|
| Zweckform 2585 | 2.08 | 1.16 | 0.98 | 1.00 | 1.46 | 1.20 | 1.84 | 1.38 | 237.72 | 63.94 |
| Epson S041061 | 1.92 | 1.09 | 0.97 | 0.97 | 1.47 | 1.18 | 1.73 | 1.47 | 193.69 | 66.95 |
| HP Bright White | 2.35 | 1.24 | 1.02 | 1.01 | 1.39 | 1.17 | 1.59 | 1.33 | 237.72 | 72.59 |
| Coating Trial 2 | 2.75 | 1.32 | 1.04 | 1.04 | 1.44 | 1.33 | 1.88 | 1.34 | 204.01 | 69.55 |
| Coating Trial 3 | 2.64 | 1.39 | 1.10 | 1.14 | 1.49 | 1.31 | 1.92 | 1.40 | 208.56 | 72.59 |

The above table shows that the optical density obtained with the product of the invention was clearly superior to not only comparable market papers, but sometimes higher quality paper as well. The bleeding obtained with the product of the invention is equal or inferior to other equivalent market papers. The feathering obtained with the product of the invention is lower than or similar to other comparable market papers. The paper brightness was similar to market papers.

TABLE 14

Optical Density and Bleeding/Feathering Results of Paper Coated with the Coating Pigment of the Invention, as Opposed to Market Papers

| Printer type Canon I950 | black 100% | black 80% | cyan (c), 100% | magenta (m) 100% | yellow (y), 100% | Green, c 100% y 100% | Blue, m 100% c 100% | Red, y 100% m 100% | Bleed-ing | Feath-ering |
|---|---|---|---|---|---|---|---|---|---|---|
| Zweckform 2585 | 2.07 | 1.20 | 2.30 | 1.74 | 1.71 | 1.58 | 2.31 | 1.85 | 198.63 | 59.64 |
| Epson S041061 | 2.06 | 1.17 | 2.06 | 1.80 | 1.66 | 1.42 | 1.82 | 1.68 | 204.45 | 63.72 |
| HP Bright White | 1.72 | 1.03 | 1.73 | 1.58 | 1.49 | 1.26 | 1.58 | 1.46 | 245.32 | 90.74 |
| Coating Trial 2 | 2.06 | 1.17 | 1.91 | 2.00 | 1.75 | 1.56 | 1.94 | 1.89 | 225.42 | 72.14 |

TABLE 14-continued

Optical Density and Bleeding/Feathering Results of Paper
Coated with the Coating Pigment of the Invention, as Opposed to
Market Papers

| Printer type Canon I950 | black 100% | black 80% | Optical density Gretag-Macbeth D186 | | | | | | Bleed-ing | Feath-ering |
|---|---|---|---|---|---|---|---|---|---|---|
| | | | cyan (c), 100% | magenta (m) 100% | yellow (y), 100% | Green, c 100% y 100% | Blue, m 100% c 100% | Red, y 100% m 100% | | |
| Coating Trial 3 | 2.10 | 1.20 | 1.93 | 2.03 | 1.77 | 1.60 | 1.98 | 1.91 | 230.46 | 78.07 |

The above table shows that the optical density obtained with the product of the invention is superior to comparable market papers, and sometimes surpassed even higher quality paper values. The bleeding obtained with the product of the invention is equal or inferior to other equivalent market papers. The feathering obtained with the product of the invention is lower than other comparable market papers. The paper brightness was similar to market papers.

Papers Coated with Coating Slurries 4 and 5:

The following coating trials were performed using aluminium and zinc-based PCC slurries of Examples 6 and 8, thermally upconcentrated. Coating the base paper with Coating Slurries 4 and 5 lead, respectively, to Coating Trial 4 and 5 results below.

Bleeding and feathering were measured using the second printing test card and Personal IAS® (Image Analysis System) instrumentation from Quality Engineering Association, Inc., according to the standard procedures given by the manufacturer. The lower the measured value, the better the bleeding and feathering.

TABLE 15

Optical Density and Bleeding/Feathering Results of Paper
Coated with the Coating Pigment of the Invention, as Opposed to
Market Papers

| Printer type Epson stylus photo 950 | black 100% | black 80% | Optical density Gretag-Macbeth D186 | | | | | | Bleed-ing | Feath-ering |
|---|---|---|---|---|---|---|---|---|---|---|
| | | | cyan (c), 100% | magenta (m) 100% | yellow (y), 100% | Green, c 100% y 100% | Blue, m 100% c 100% | Red, y 100% m 100% | | |
| Zweckform 2585 | 2.38 | 1.29 | 2.25 | 1.64 | 1.54 | 1.66 | 2.04 | 1.55 | 164.14 | 58.00 |
| Epson S041061 | 2.45 | 1.23 | 2.09 | 1.59 | 1.49 | 1.54 | 1.85 | 1.51 | 166.34 | 67.63 |
| HP Bright White | 2.09 | 1.06 | 1.72 | 1.42 | 1.34 | 1.32 | 1.61 | 1.31 | 239.20 | 104.37 |
| Coating Trial 4 | 2.27 | 1.18 | 1.96 | 1.51 | 1.45 | 1.38 | 1.69 | 1.42 | 195.99 | 67.18 |
| Coating Trial 5 | 2.21 | 1.15 | 1.91 | 1.42 | 1.37 | 1.38 | 1.69 | 1.38 | 192.84 | 69.75 |

The above table shows that the optical density obtained with the product of the invention is superior to comparable multipurpose market papers, and approaches the quality of a superior inkjet paper. The bleeding obtained with the product of the invention is equal or inferior to other equivalent market papers. The feathering obtained with the product of the invention is inferior to other market papers.

The improved optical density, bleeding and feathering attest to an improved balance of absorption/adsorption properties relative to competing market products.

TABLE 16

Optical Density and Bleeding/Feathering Results of Paper Coated with the Coating Pigment of the Invention, as Opposed to Market Papers Optical density Gretag-Macbeth D186

| Printer type HP Deskjet 5550 | black 100% | black 80% | cyan (c), 100% | magenta (m) 100% | yellow (y), 100% | Green, c 100% y 100% | Blue, m 100% c 100% | Red, y 100% m 100% | Bleeding | Feathering |
|---|---|---|---|---|---|---|---|---|---|---|
| Zweckform 2585 | 2.08 | 1.16 | 0.98 | 1.00 | 1.46 | 1.20 | 1.84 | 1.38 | 237.72 | 63.94 |
| Epson S041061 | 1.92 | 1.09 | 0.97 | 0.97 | 1.47 | 1.18 | 1.73 | 1.47 | 193.69 | 66.95 |
| HP Bright White | 2.35 | 1.24 | 1.02 | 1.01 | 1.39 | 1.17 | 1.59 | 1.33 | 237.72 | 72.59 |
| Coating Trial 4 | 2.72 | 1.25 | 1.09 | 1.07 | 1.39 | 1.21 | 1.78 | 1.36 | 193.32 | 81.32 |
| Coating Trial 5 | 2.82 | 1.12 | 1.04 | 1.01 | 1.23 | 1.11 | 1.66 | 1.20 | 191.85 | 80.37 |

The optical density results of the invention were superior to comparable market papers as well as higher quality inkjet papers. A decreased bleeding and an increase in feathering relative to comparable papers were also noted.

TABLE 17

Optical Density and Bleeding/Feathering Results of Paper Coated with the Coating Pigment of the Invention, as Opposed to Market Papers Optical density Gretag-Macbeth D186

| Printer type Canon I950 | black 100% | black 80% | cyan (c), 100% | magenta (m) 100% | yellow (y), 100% | Green, c 100% y 100% | Blue, m 100% c 100% | Red, y 100% m 100% | Bleeding | Feathering |
|---|---|---|---|---|---|---|---|---|---|---|
| Zweckform 2585 | 2.07 | 1.20 | 2.30 | 1.74 | 1.71 | 1.58 | 2.31 | 1.85 | 198.63 | 59.64 |
| Epson S041061 | 2.06 | 1.17 | 2.06 | 1.80 | 1.66 | 1.42 | 1.82 | 1.68 | 204.45 | 63.72 |
| HP Bright White | 1.72 | 1.03 | 1.73 | 1.58 | 1.49 | 1.26 | 1.58 | 1.46 | 245.32 | 90.74 |
| Coating Trial 4 | 1.83 | 1.15 | 2.01 | 1.73 | 1.62 | 1.42 | 1.66 | 1.61 | 208.92 | 68.62 |
| Coating Trial 5 | 1.71 | 1.16 | 2.00 | 1.65 | 1.55 | 1.40 | 1.59 | 1.65 | 204.04 | 65.63 |

The optical density results of the invention were always superior to those of other comparable market papers, and approached the values given by superior quality papers. A decreased bleeding and similar degree of feathering relative to comparable market papers was noted.

The present invention also covers the technical equivalents of the above description, as well as options that would be easily available to the skilled man when reading the present application.

The invention claimed is:

1. A process for preparing precipitated calcium carbonate (PCC) useful for ink jet printing applications comprising the steps of:
   a) preparing a calcium hydroxide slurry by mixing quicklime (CaO) with water;
   b) screening the calcium hydroxide slurry obtained in step a) to obtain a screened slurry;
   c) adjusting the temperature of the screened slurry to obtain a temperature adjusted slurry;
   d) contacting the temperature adjusted slurry with a carbon dioxide-containing gas at a carbonation gas flow rate of below 30 liters per minute at standard temperature and pressure per kilogram calcium hydroxide in the presence of (i) magnesium sulphate and aluminium sulphate, (ii) magnesium sulphate and zinc sulphate, or (iii) magnesium sulphate, aluminium sulphate and zinc sulphate, to obtain agglomerates/aggregates;
   e) screening the agglomerates/aggregates obtained in step d) to obtain ultrafine PCC agglomerates having a mean aggregate diameter of 1 to 5 μm, wherein the ultrafine PCC agglomerates comprise ultrafine calcium carbonate particles bound together; and f) subjecting the ultrafine PCC agglomerates obtained in step e) to dewatering and/or redispersing steps to obtain a PCC product comprising agglomerates having a mean aggregate diameter of 1 to 5 μm and a concentration of 25 to 60% solids.

2. The process of claim 1, wherein the calcium hydroxide is prepared in step a) by mixing quicklime with water in a weight ratio of CaO:water between 1:3 and 1:20.

3. The process of claim 2, wherein the weight ratio of CaO:water in step a) is between 1:5 and 1:12.

4. The process of claim 2, wherein the weight ratio of CaO:water in step a) is between 1:7 and 1:10.

5. The process of claim 1, wherein the calcium hydroxide slurry is screened in step b) with a 100 μm screen.

6. The process of claim 1, wherein the temperature of the slurry in step c) is adjusted to between 10 and 70° C.

7. The process of claim 1, wherein the temperature of the slurry in step c) is adjusted to between 15 and 50° C.

8. The process of claim 1, wherein the temperature of the slurry in step c) is adjusted to between 15 and 30° C.

9. The process of claim 1, wherein in step d) magnesium sulphate is introduced before carbonation or at the beginning of carbonation.

10. The process of claim 1, wherein in step d) magnesium sulphate is added before the addition of aluminium and/or zinc sulphate or in combination with the addition of aluminium and/or zinc sulphate.

11. The process of claim 1, wherein in step d) carbonation takes place in the presence of magnesium sulphate and aluminium sulphate.

12. The process of claim 1, wherein in step d) carbonation takes place in the presence of magnesium sulphate, aluminium sulphate and zinc sulphate.

13. The process of claim 1, wherein in step d) carbonation takes place in the presence of magnesium sulphate and zinc sulphate.

14. The process of claim 1, wherein in step d) magnesium sulphate is added during carbonation along with aluminium and/or zinc sulphate.

15. The process of claim 1, wherein in step d) magnesium sulphate is added before carbonation and aluminium sulphate and/or zinc sulphate is added during carbonation.

16. The process of claim 1, wherein in step d) carbonation takes place in the presence of an acid.

17. The process of claim 16, wherein the acid is added before or at the beginning of carbonation.

18. The process of claim 16, wherein the acid is sulphuric acid.

19. The process of claim 18, wherein the sulphuric acid is a 10% by weight solution of sulphuric acid.

20. The process of claim 18, wherein the addition of sulphuric acid takes place simultaneously with the addition of aluminium or zinc sulphate.

21. The process of claim 1, wherein in step d) the temperature of the slurry is observed to rise up to between 40 to 80° C.

22. The process of claim 1, wherein in step d) the temperature of the slurry is observed to rise up to between 50 to 60° C.

23. The process of claim 1, wherein in step d) the temperature of the slurry is observed to rise up to between to 56 and 57° C.

24. The process of claim 1, wherein in step d) the carbonation gas flow rate is in the range of 1 to 30 liters per minute at standard temperature and pressure per kilogram calcium hydroxide.

25. The process of claim 1, wherein in step d) the carbonation gas flow rate is in the range of 10 to 20 liters per minute at standard temperature and pressure per kilogram calcium hydroxide.

26. The process of claim 1, wherein in step d) the carbonation gas flow rate about 19.7 liters per minute at standard temperature and pressure per kilogram calcium hydroxide.

27. The process of claim 1, wherein in step d) the carbonation gas is $CO_2$ or a mixture of $CO_2$ and one or more other gases.

28. The process of claim 27, wherein the one or more other gases is air and/or nitrogen.

29. The process of claim 1, wherein in step d) the carbonation is completed when conductivity reaches a minimum and pH drops below 8.

30. The process of claim 1, wherein in step d) agglomerates/aggregates are obtained at a concentration of 5 to 25% solids.

31. The process of claim 1, wherein in step d) agglomerates/aggregates are obtained at a concentration of 15 to 20% solids.

32. The process of claim 1, wherein in step e) the screening is performed with a 45 μm screen.

33. The process of claim 1, wherein the ultrafine PCC agglomerates obtained in step e) comprise ultrafine calcium carbonate particles bound together to form stable porous spherical aggregates.

34. The process of claim 33, wherein the ultrafine calcium carbonate particles have a primary acicular particle size of 20 to 50 nm, and an aspect ratio of between 1:2 and 1:10.

35. The process of claim 1, wherein the ultrafine PCC agglomerates have an average diameter of 2 μm.

36. The process of claim 1, wherein in step f), the ultrafine PCC agglomerates obtained in step e) are subjected to dewatering and/or redispersing steps to obtain a PCC product having a concentration of 35 to 50% solids.

37. The process of claim 1, wherein in step f), the ultrafine PCC agglomerates obtained in step e) are subjected to dewatering and/or redispersing steps to obtain a PCC product having a concentration of 39 to 40% solids.

38. The process of claim 1, wherein the dewatering comprises upconcentrating the ultrafine PCC agglomerates under sufficiently gentle or mild conditions for the aggregates/agglomerates not to be substantially destroyed, wherein said upconcentrating is conducted with the use of a dispersing aid.

39. The process of claim 38, wherein the amount of the added dispersant aid is controlled so that the ultrafine PCC agglomerates are coated.

40. The process of claim 38, wherein the upconcentration is performed in a centrifuge, a pressurized filter, by vacuum filtration or by thermal upconcentration, in the presence of a dispersant aid.

41. The process of claim 38, wherein the dispersant aid is a cationic, anionic or combination dispersant.

42. The process of claim 38, wherein the dispersant aid comprises a sodium salt of polyacrylic acid.

43. The process of claim 38, wherein the dispersant aid is introduced at a concentration of 1.5 to 3.5 dry weight percent of polyacrylic acid based on dry weight percent of PCC.

44. The process of claim 38, wherein the upconcentration results in a concentrated material that is optionally washed with water, followed by redispersion to obtain the PCC product.

45. The process of claim 1, wherein the PCC product comprises agglomerates having an average diameter of 2 μm.

46. The process of claim 1, wherein the PCC product has a fraction of fines below 2 μm of less than 20%.

47. The process of claim 1, wherein the PCC product has a fraction of fines below 2 μm of less than 15%.

48. The process of claim 1, wherein the PCC product has a specific surface area of 30 to 100 m²/g.

49. The process of claim 1, wherein the PCC product has a specific surface area of 50 to 80 m²/g.

* * * * *